(12) United States Patent
Lu et al.

(10) Patent No.: US 11,500,415 B2
(45) Date of Patent: Nov. 15, 2022

(54) LAPTOP COMPUTER AND CHASSIS THEREOF

(71) Applicant: PEGATRON CORPORATION, Taipei (TW)

(72) Inventors: Chih-Hao Lu, Taipei (TW); Hsin-Min Tien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/188,630

(22) Filed: Mar. 1, 2021

(65) Prior Publication Data

US 2021/0286406 A1    Sep. 16, 2021

(30) Foreign Application Priority Data

Mar. 11, 2020 (TW) ................................ 109108083

(51) Int. Cl.
*G06F 1/16* (2006.01)

(52) U.S. Cl.
CPC .......... *G06F 1/1616* (2013.01); *G06F 1/1681* (2013.01)

(58) Field of Classification Search
CPC .... G06F 1/1613; G06F 1/1615; G06F 1/1616; G06F 1/1618; G06F 1/162
See application file for complete search history.

(56) References Cited

U.S. PATENT DOCUMENTS

| 7,110,248 B2 * | 9/2006 | Weng ................... G06F 1/1649 |
| | | 361/679.27 |
| 2003/0053287 A1 * | 3/2003 | Baldwin ............... G06F 1/1698 |
| | | 361/679.01 |
| 2016/0034004 A1 | 2/2016 | Park |
| 2018/0210504 A1 * | 7/2018 | Moser .................. G06F 1/1679 |
| 2018/0373292 A1 * | 12/2018 | Perelli .................. G06F 1/1649 |
| 2019/0317561 A1 * | 10/2019 | Cheng .................. G06F 1/1686 |
| 2020/0285273 A1 * | 9/2020 | Liang .................... G06F 1/1649 |
| 2021/0315119 A1 * | 10/2021 | Mizoguchi ........... G06F 1/1656 |

(Continued)

FOREIGN PATENT DOCUMENTS

| JP | H11219232 A | 8/1999 |
| JP | 3069375 U | 6/2000 |
| TW | M303589 U | 12/2006 |

(Continued)

*Primary Examiner* — Anthony Q Edwards
(74) *Attorney, Agent, or Firm* — Muncy, Geissler, Olds & Lowe, P.C.

(57) ABSTRACT

A laptop computer and a chassis thereof are disclosed. The chassis comprises a display case, a host case, a shielding member and a connecting member. The display case includes an upper cover having a first notch and a screen frame connected with the upper cover. The host case includes a keyboard frame having a second notch and a bottom cover having a third notch. The bottom cover is connected with the keyboard frame. The first, second and third notches together form an accommodation space to accommodate at least one pivot structure. The display case is rotatable relative to the host case through the pivot structure. The shielding member is configured to cover at least part of the first notch. The connecting member is disposed between the display case and the host case, and located in the accommodation space. The pivot structure is located in the connecting member.

16 Claims, 11 Drawing Sheets

(56) References Cited

U.S. PATENT DOCUMENTS

2022/0100238 A1* 3/2022 Siddiqui ............... G06F 1/1683

FOREIGN PATENT DOCUMENTS

| TW | M386525 U | 8/2010 |
| TW | I487441 B | 6/2015 |
| TW | 201928575 A | 7/2019 |
| WO | WO-2014132413 A1 | 9/2014 |

* cited by examiner

LAPTOP COMPUTER AND CHASSIS THEREOF

CROSS REFERENCE TO RELATED APPLICATIONS

This Non-provisional application claims priority under 35 U.S.C. § 119(a) on Patent Application No(s). 109108083 filed in Taiwan, Republic of China on Mar. 11, 2020, the entire contents of which are hereby incorporated by reference.

BACKGROUND

Technology Field

This disclosure relates to a chassis of a laptop computer and a laptop computer comprising the same.

Related Art

Generally, there are two mainstream appearances of current laptop computers on the market, including the clamshell type laptop computers and the convertible type laptop computers. Regarding the clamshell type laptop computer, the display case can be opened for 180 degrees at most with respect to the host case. Regarding the convertible type laptop computer, the display case can be turned for over 180 degrees with respect to the host case. Since the appearances of these two types of laptop computers are different, the four major parts of the clamshell type laptop computers cannot be compatibly used in the convertible type laptop computers, and vice versa. Accordingly, the manufacturers have to design different molds to fabricate different chassis for the different types of laptop computers, thereby resulting in the disadvantages of high design and develop cost and more types of parts and materials to be prepared. These disadvantages may indirectly increase the manufacturing cost.

SUMMARY

This disclosure is to provide a chassis, which can be compatibly applied to different types of laptop computers, and a laptop computer comprising the chassis.

In addition, this disclosure also provides a chassis for a laptop computer and a laptop computer comprising the same that can effectively reduce the design and develop cost, thereby improving the manufacturing flexibility for the manufacturers and utility efficiency of molds.

In addition, this disclosure further provides a chassis for a laptop computer and a laptop computer comprising the same that can decrease the types of parts and materials to be prepared, and have the advantage of dynamically adjusting the manufacturing machine based on the market requirements.

To achieve the above, a chassis for a laptop computer comprises a display case, a host case, a first shielding member and a connecting member. The display case includes an upper cover and a screen frame. The upper cover has a first notch. The screen frame is connected with the upper cover. The host case includes a keyboard frame and a bottom cover. The keyboard frame has a second notch. The bottom cover is connected with the keyboard frame. The bottom cover has a third notch disposed corresponding to the first notch and the second notch, individually. The first notch, the second notch, and the third notch together form an accommodation space to accommodate at least one pivot structure. The display case is rotatable with relative to the host case through the at least one pivot structure. The first shielding member is configured to cover at least a part of the first notch. The connecting member is disposed between the display case and the host case. The connecting member is located in the accommodation space, and the at least one pivot structure is located in the connecting member.

In one embodiment, the chassis is applied to a clamshell type laptop computer, and the first shielding member is connected with the upper cover.

In one embodiment, the chassis is applied to a clamshell type laptop computer, and the first shielding member is connected with the upper cover and the screen frame.

In one embodiment, the chassis is applied to a convertible type laptop computer, two of the pivot structures are provided and disposed at two opposite sides of the accommodation space, the connecting member comprises two pivot accommodation members, and the two pivot structures are located in the two pivot accommodation members, respectively.

In one embodiment, the connecting member further comprises a second shielding member, and the second shielding member is connected with the host case, and is located between the two pivot accommodation members.

In one embodiment, the second shielding member is configured to cover parts of the second notch and the third notch.

In one embodiment, the second shielding member comprises a first shielding sub-member and a second shielding sub-member, the first shielding sub-member is configured to cover a part of the second notch, and the second shielding sub-member is configured to cover a part of the third notch.

In one embodiment, the first shielding sub-member is connected with the keyboard frame, and the second shielding sub-member is connected with the bottom cover.

To achieve the above, this disclosure also provides a laptop computer comprising the above-mentioned chassis.

To achieve the above, a chassis of a laptop computer comprises a display case, a host case, and a connecting member. The display case includes an upper cover and a screen frame, and the host case includes a keyboard frame, and a bottom cover. The screen frame is connected with the upper cover. The keyboard frame has a first notch. The bottom cover is connected with the keyboard frame. The bottom cover has a second notch disposed corresponding to the first notch. The first notch and the second notch together form an accommodation space to accommodate at least one pivot structure. The display case is rotatable with relative to the host case through the at least one pivot structure. The connecting member is disposed between the display case and the host case. The connecting member is located in the accommodation space, and the at least one pivot structure is located in the connecting member.

In one embodiment, the connecting member further comprises a shielding member, the shielding member is connected with the host case, and the shielding member is located between two pivot accommodation members.

In one embodiment, the shielding member is configured to cover parts of the first notch and the second notch.

In one embodiment, the shielding member comprises a first shielding sub-member and a second shielding sub-member, the first shielding sub-member is configured to cover a part of the first notch, and the second shielding sub-member is configured to cover a part of the second notch.

In one embodiment, when the laptop computer is a clamshell type laptop computer, the upper cover further comprises two third notches, and the two third notches are disposed corresponding to the two pivot accommodation members.

In one embodiment, the laptop computer can be a clamshell type laptop computer or a convertible type laptop computer, and the upper cover, the keyboard frame and the bottom cover are compatibly used in the clamshell type laptop computer and the convertible type laptop computer.

As mentioned above, in the chassis and the laptop computer comprising the same of this disclosure, the upper cover has a first notch, the keyboard frame has a second notch, the bottom cover has a third notch, and the first notch, the second notch, and the third notch together form an accommodation space to accommodate at least one pivot structure. Accordingly, the display case is rotatable with relative to the host case through the at least one pivot structure. In addition, the first shielding member is configured to cover at least a part of the first notch, and the connecting member (may include the second shielding member) is disposed between the display case and the host case, and located in the accommodation space for accommodating the at least one pivot structure. Alternatively, the keyboard frame has a first notch, the bottom cover has a second notch, and the first notch and the second notch together form an accommodation space to accommodate at least one pivot structure. Accordingly, the display case is rotatable with relative to the host case through the at least one pivot structure. In addition, the connecting member (may include the shielding member) is disposed between the display case and the host case, and the connecting member is located in the accommodation space for accommodating the at least one pivot structure. Based on the above-mentioned structural design, the upper cover, the keyboard frame and the bottom cover of the chassis can be compatibly applied to the clamshell type laptop computer and the convertible type laptop computer, so that the manufacturers do not need to prepare different chassis (the upper cover, the keyboard frame and the bottom cover) and the molds thereof for manufacturing different types of laptop computers. Since three major parts of the chassis (i.e. the upper cover, the keyboard frame and the bottom cover) and the molds thereof can be compatibly used, the design and develop cost can be effectively reduce, the manufacturing flexibility for the manufacturers and the utility efficiency of molds can be improved, the types of parts and materials to be prepared can be decreased, and the manufacturing machine can be dynamically adjusted based on the market requirements.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENT

The present disclosure will be apparent from the following detailed description, which proceeds with reference to the accompanying drawings, wherein the same references relate to the same elements.

To be noted, the terms "connect", "connecting", "connected" and "connection" in this disclosure can be referred to connect two components by, for example but not limited to, thermal melting, engaging or screwing depending on actual design and assembly requirements, and this disclosure is not limited. In addition, the drawings of this disclosure only show the chassis of the laptop computer (i.e. appearance parts), and the internal components, assemblies, units, or circuits of the laptop computer are not the focus of the disclosure and therefore are not shown.

Figure 1A:
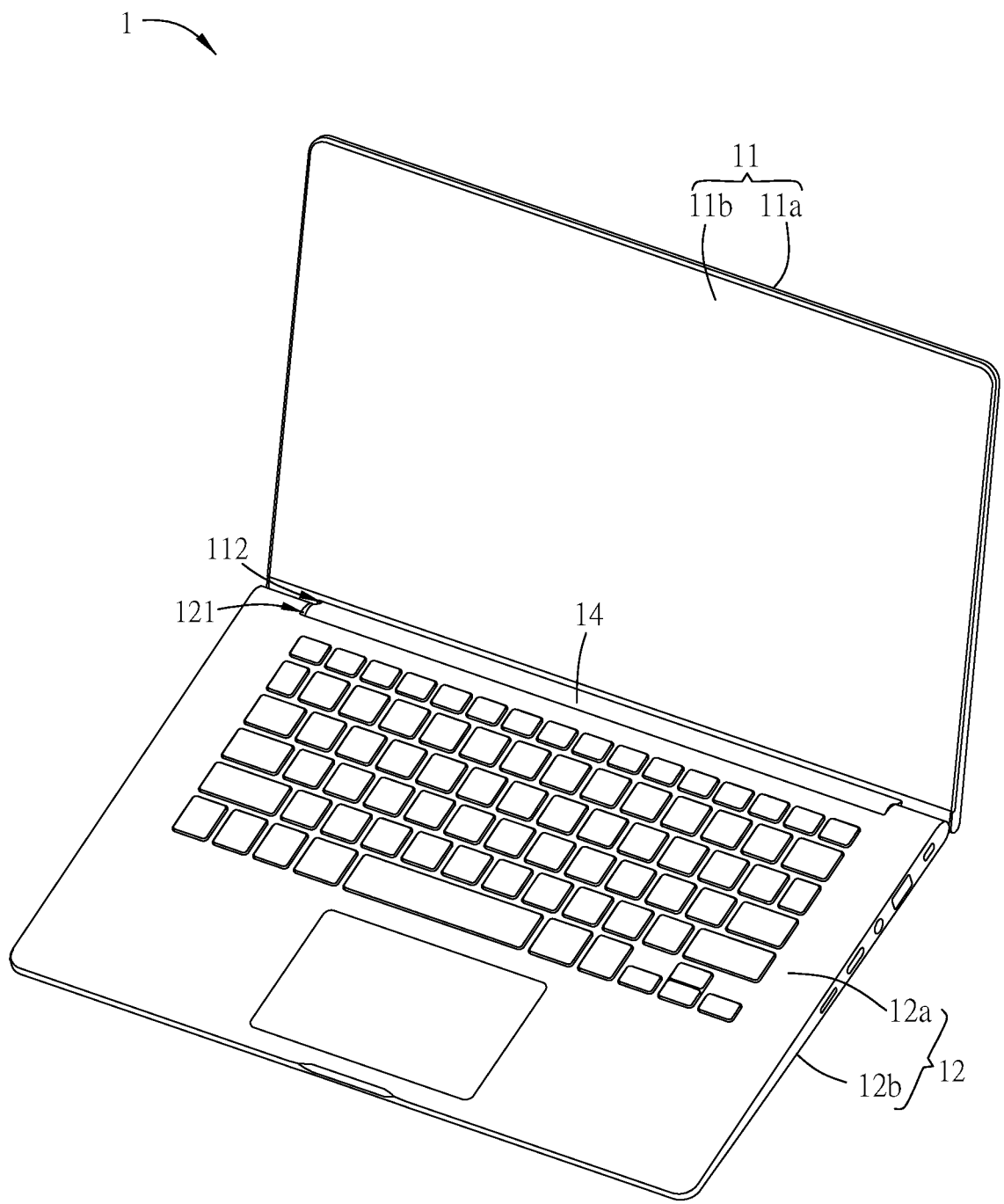
FIG. 1A is a front view of a chassis of a laptop computer according to a first embodiment of this disclosure.
Figure 1B:
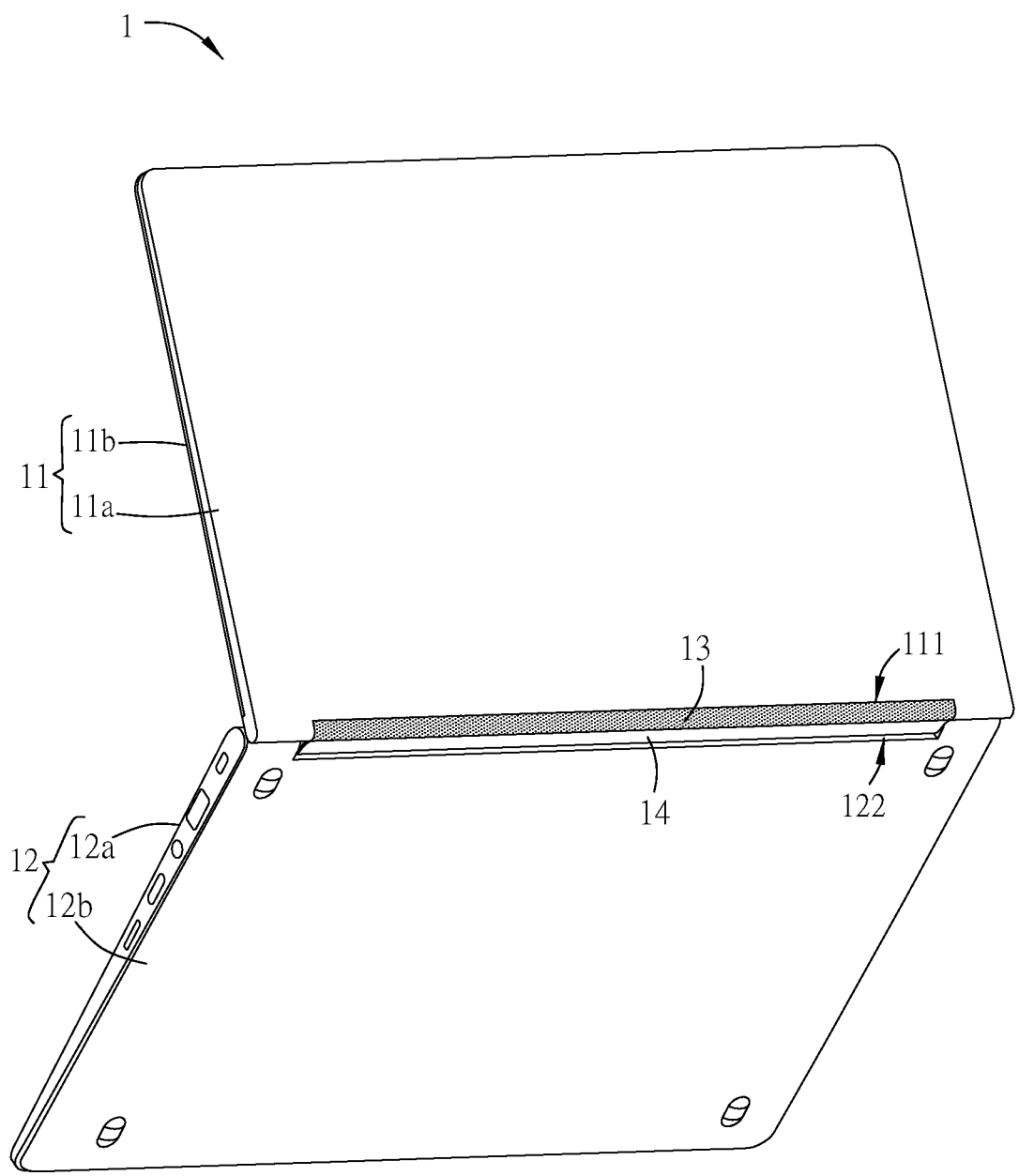
FIG. 1B is a rear view of the chassis according to the first embodiment of this disclosure.
Figure 1C:
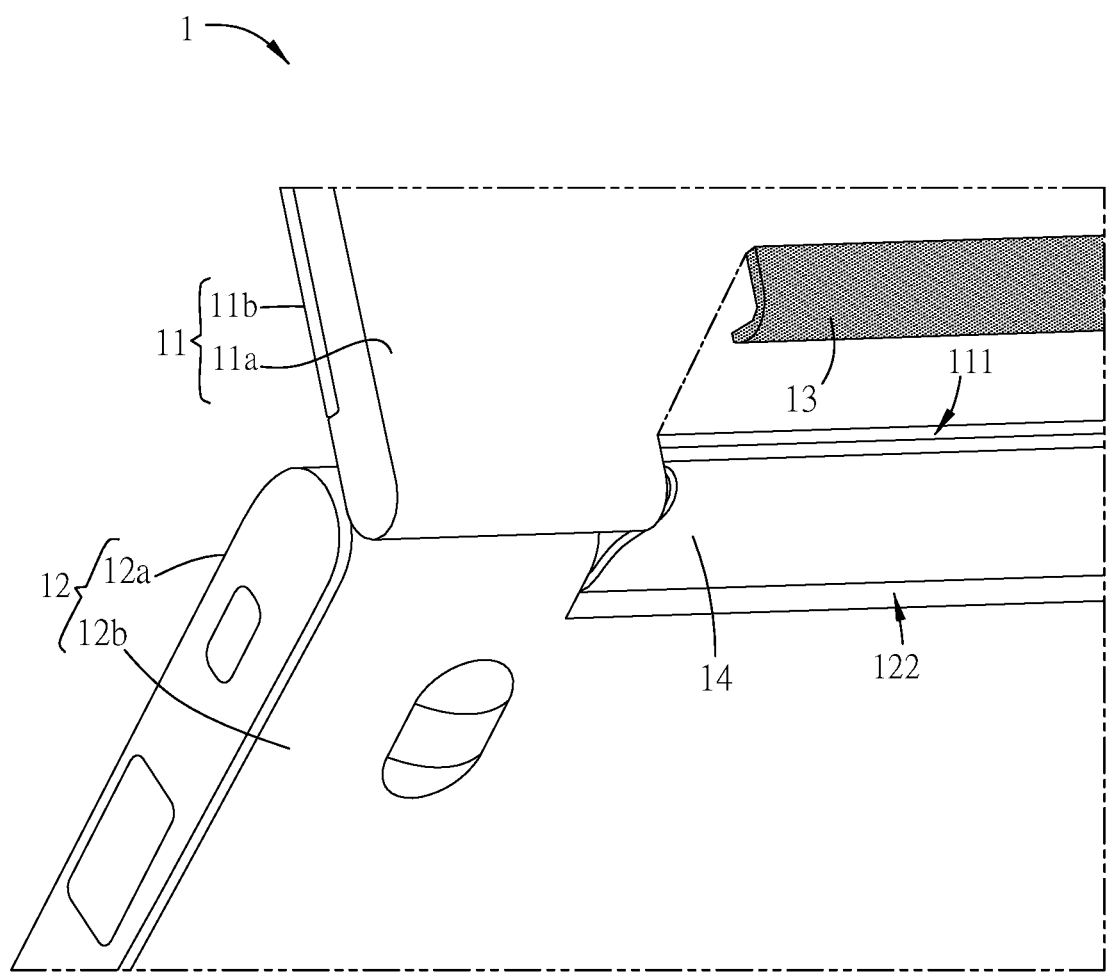
FIG. 1C is a partial exploded view of the rear part of the chassis according to the first embodiment of this disclosure.

FIGS. 1A to 1C are, respectively, a front view, a rear view and a partial exploded view of a chassis of a laptop computer according to a first embodiment of this disclosure.

Referring to FIGS. 1A to 1C, a chassis 1 of a laptop computer is applied to, for example, a clamshell type laptop computer. The chassis 1 comprises an upper cover 11*a*, a screen frame 11*b*, a keyboard frame 12*a*, a bottom cover 12*b*, a first shielding member 13, and a connecting member 14.

The screen frame 11*b* and the upper cover 11*a* are connected to form a display case 11. In more detailed, the center portion of the screen frame 11*b* is empty, so that the display screen (panel) can be installed inside the display case 11 and partially exposed from the empty portion of the screen frame 11*b*. Besides the display screen, the components or circuits for controlling the display panel can also be accommodated inside the display case 11. The display screen and the components or circuits for controlling the display panel are not the focus of the disclosure, and the detailed descriptions thereof will be omitted. The upper cover 11*a* has a first notch 111 (FIGS. 1B and 1C), and the first notch 111 faces toward the keyboard frame 12*a* and the bottom cover 12*b*.

The bottom cover 12*b* is connected with the keyboard frame 12*a* to form a host case 12. In this embodiment, the keyboard frame 12*a* has a plurality of openings, so that a plurality of keys can be disposed in the host case 12 and partially exposed from the keyboard frame 12*a*. Besides the keys, the host case 12 can further accommodate the control circuit board, the memory, the I/O unit, the control circuit, or other accessories. These components are known to the art and are not central to the present disclosure, and the detailed descriptions thereof will be omitted. The keyboard frame 12*a* has a second notch 121 (FIG. 1A), and the second notch 121 faces toward the display case 11.

As shown in FIGS. 1B and 1C, the bottom cover 12*b* has a third notch 122, and the first notch 111, the second notch 121 and the third notch 122 are disposed corresponding to each other. In other words, the position of the third notch 122 is located corresponding to the positions of the first notch 111 and the second notch 121. Specifically, the upper cover 11a has the first notch 111 (as shown in FIG. 1A), the keyboard frame 12a has the second notch 121, and the bottom cover 12b has the third notch 122 (as shown in FIGS. 1B and 1C). In order to accommodate the additional component, the first notch 111, the second notch 121 and the third notch 122 are disposed corresponding to each other, and the widths thereof are correspondingly the same in the lateral direction. Accordingly, the first notch 111, the second notch 121 and the third notch 122 can together form an accommodating space for accommodating at least one pivot structure (not shown), so that the display case 11 can be rotatable with relative to the host case 12 through the at least one pivot structure. In this embodiment, one pivot structure is configured to connect the display case 11 and the host case 12, individually, so that the chassis 1 becomes the chassis of a clamshell type laptop computer.

The first shielding member 13 is configured to cover at least a part of the first notch 111 (FIGS. 1B and 1C). In this embodiment, the first shielding member 13 is connected to the upper cover 11a and covers the entire first notch 111 of the upper cover 11a. The configuration of the first shielding member 13 can decorate the back appearance of the display case 11, thereby remaining the integration of the back surface of the display case 11.

The connecting member 14 is disposed between the display case 11 and the host case 12, and the connecting member 14 is located in the accommodation space for accommodating the above-mentioned at least one pivot structure. In other words, the connecting member 14 is configured to accommodate the pivot structure connecting between the display case 11 and the host case 12. Accordingly, the display case 11 can be relatively moved (i.e., rotated) with respect to the host case 12. In addition, the connecting member 14 can further decorate or modify the appearance of the laptop computer. Herein, the connecting member 14 of this disclosure can also function as a pivot accommodation member. In some embodiments, the connecting member 14 can be directly or indirectly connected to the keyboard frame 12a. In some embodiments, the connecting member 14 can be directly or indirectly connected to the bottom cover 12b. In some embodiments, the connecting member 14 can be directly or indirectly connected to both of the keyboard frame 12a and the bottom cover 12b. Moreover, in order to allow the connecting member 14 (as well as the pivot structure thereinside) to operate normally (rotate) without generating mechanical interference, one side of the screen frame 11b facing the host case 12 is configured with a fourth notch 112 (FIG. 1A). The fourth notch 112 is disposed adjacent to the connecting member 14 and located corresponding to the connecting member 14, wherein a part of the connecting member 14 is located within the fourth notch 112. The configuration of the fourth notch 112 can prevent the mechanical interference between the connecting member 14 and the screen frame 11b while the display case 11 is relatively moved (rotated) with respect to the host case 12.

Figure 2A:
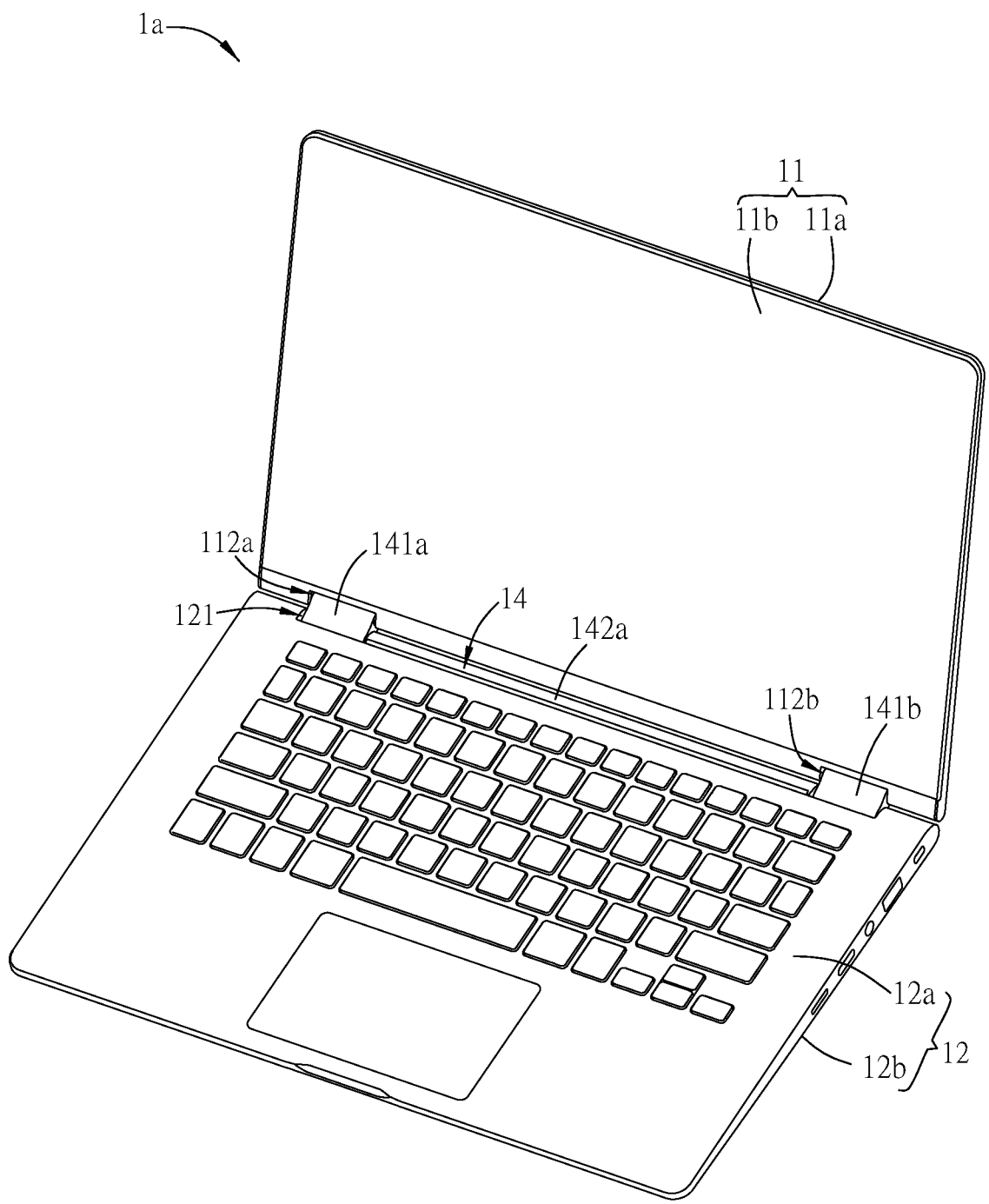
FIG. 2A is a front view of a chassis of a laptop computer according to a second embodiment of this disclosure.
Figure 2B:
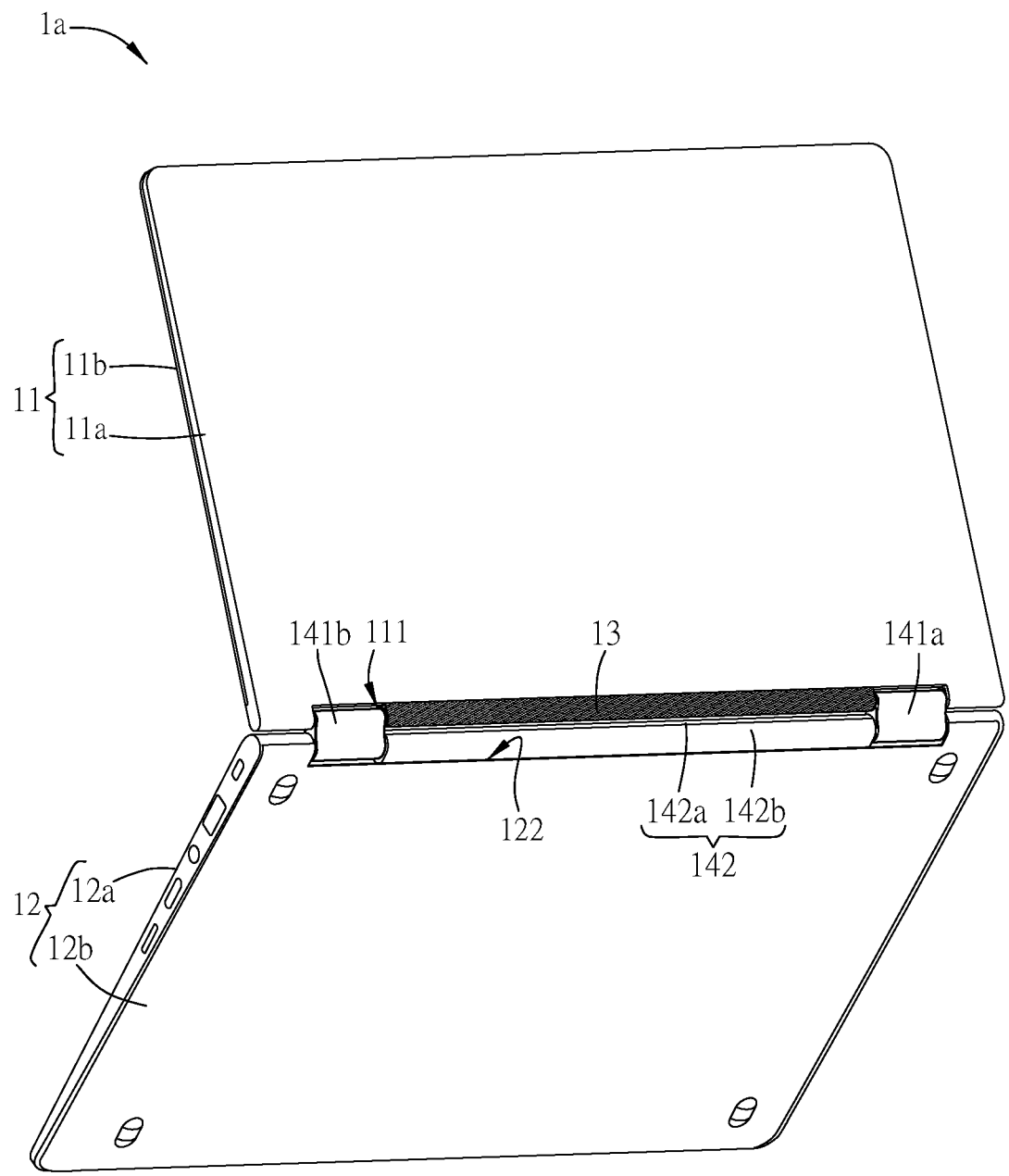
FIG. 2B is a rear view of the chassis according to the second embodiment of this disclosure.
Figure 2C:
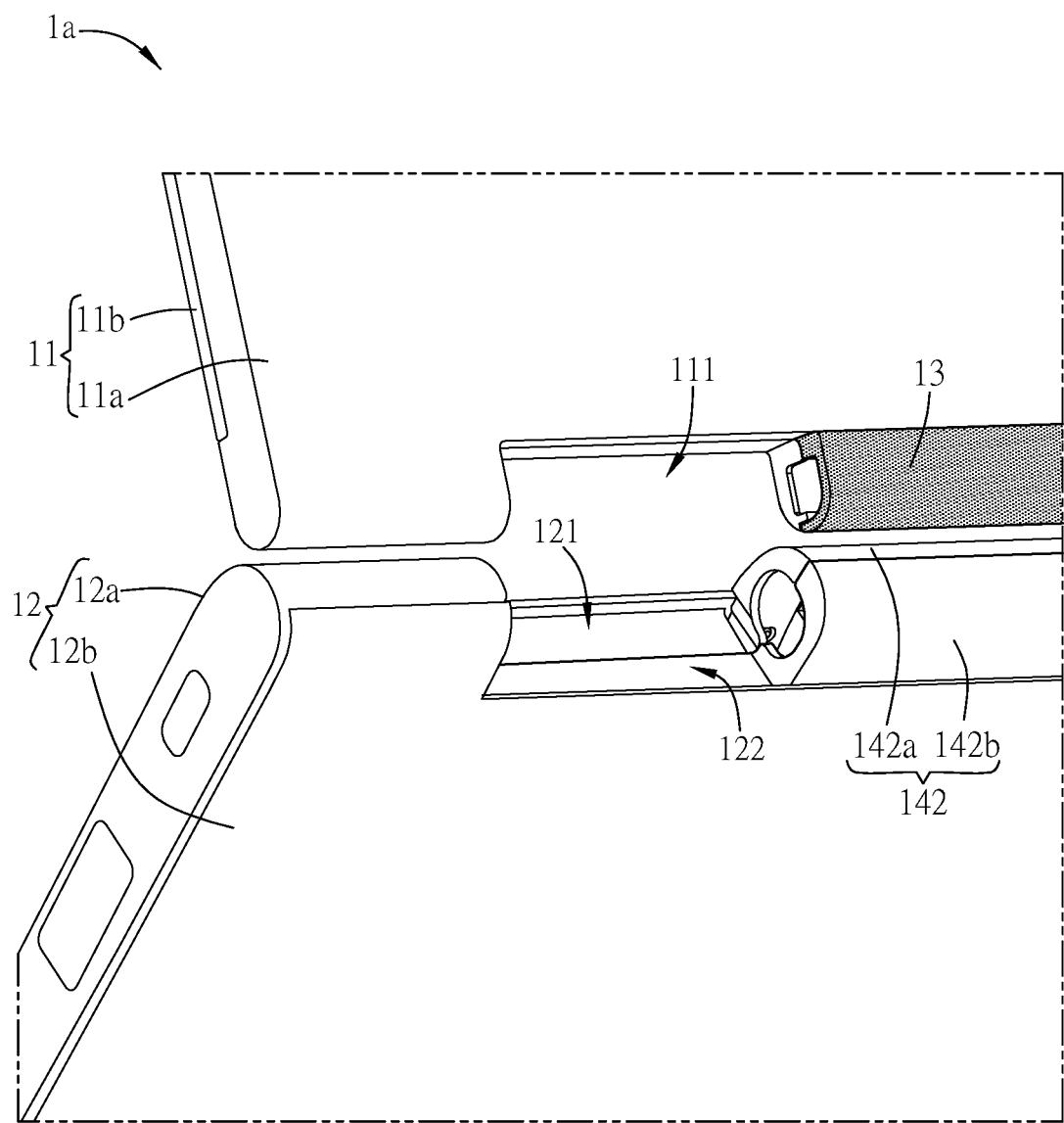
FIG. 2C is a partial exploded view of the rear part of the chassis according to the second embodiment of this disclosure.

FIGS. 2A to 2C are, respectively, a front view, a rear view and a partial exploded view of a chassis of a laptop computer according to a second embodiment of this disclosure. In this embodiment, the chassis 1a can be applied to a clamshell type laptop computer or a convertible type laptop computer, and this disclosure is not limited.

The components and connections of the components of the chassis 1a of this embodiment are mostly the same as those of the chassis 1 of the first embodiment. Different from the first embodiment, the second embodiment comprises two pivot structures, which are disposed at two opposite sides of the accommodation space between the display case 11 and the host case 12. In addition, the connecting member 14 of this embodiment comprises two pivot accommodation members 141a and 141b (FIG. 2A), and the two pivot structures can be located in the two pivot accommodation members 141a and 141b, respectively. Accordingly, the display case 11 can rotated with respect to the host case 12 through the two pivot structures. Moreover, the first shielding member 13 is configured to cover at least a part of the first notch 111 (FIGS. 2B and 2C), thereby decorating or modifying the back appearance of the display case 11. The additional parts of the first notch 111 (corresponding to two sides of the first shielding member 13) are configured with two pivot accommodation members 141a and 141b, respectively. Accordingly, when the display case 11 is relatively moved with respect to the host case 12, the pivot accommodation members 141a and 141b (as well as the pivot structures) can operate (rotate) normally. In this embodiment, the first shielding member 13 is connected to the upper cover 11a and the screen frame 11b (FIG. 2C). Furthermore, the screen frame 11b is further configured with two fourth notches 112a and 112b corresponding to the two pivot accommodation members 141a and 141b, respectively (FIG. 2A). A part of the pivot accommodation member 141a is located in the fourth notch 112a, and a part of the pivot accommodation member 141b is located in the fourth notch 112b. This configuration can prevent the mechanical interference during the rotation operation.

Besides the pivot accommodation members 141a and 141b, the connecting member 14 further comprises a second shielding member 142 (FIGS. 2B and 2C). The second shielding member 142 is configured to cover parts of the second notch 121 and the third notch 122, and the second shielding member 142 is connected to the host case 12. In this embodiment, the second shielding member 142 is located between the two pivot accommodation members 141a and 141b for decorating or modifying the appearance of the host case 12. In some embodiments, the second shielding member 142 can be connected with the keyboard frame 12a. In some embodiments, the second shielding member 142 can be connected with the bottom cover 12b. In some embodiments, the second shielding layer 142 can be connected with the keyboard frame 12a and the bottom cover 12b. The second shielding member 142 can be a single component that integrally formed as one piece, or be composed of a plurality of sub-structures. In this embodiment, the second shielding member 142 is composed of a first shielding sub-member 142a and a second shielding sub-member 142b (FIG. 2C). The first shielding sub-member 142a is configured to cover a part of the second notch 121, and the second shielding sub-member 142b is configured to cover a part of the third notch 122. In addition, the first shielding sub-member 142a is connected with the keyboard frame 12a, and the second shielding sub-member 142b is connected with the bottom cover 12b. Accordingly, the first shielding sub-member 142a and the second shielding sub-member 142b can be assembled to form the second shielding member 142 for decorating or modifying the appearance of the host case 12. Moreover, the additional parts of the second notch 121 and the third notch 122 are configured to accommodate the pivot accommodation members 141a and 141b, respectively, as shown in FIGS. 2A and 2B.

As mentioned above, in the above-mentioned two embodiments, the upper cover 11a has a first notch 111, the keyboard frame 12a has a second notch 121, the bottom cover 12b has a third notch 122, and the first notch 111, the second notch 121, and the third notch 122 together form an accommodation space to accommodate at least one pivot structure. Accordingly, the display case 11 is rotatable with relative to the host case 12 through the at least one pivot structure. In addition, the first shielding member 13 is configured to cover at least a part of the first notch 111, and the connecting member 14 (may include the second shielding member 142) is disposed between the display case 11 and the host case 12, and located in the accommodation space for accommodating the at least one pivot structure. Based on the above-mentioned structural design, the upper cover 11a, the keyboard frame 12a and the bottom cover 12b can be compatibly used in the chassis 1 of the clamshell type laptop computer (the first embodiment) and the chassis 1a of the convertible type laptop computer (the second embodiment) by adopting the proper decorating member and connecting member. For example, the chassis 1 of the clamshell type laptop computer adopts the first shielding member 13, and the chassis 1a of the convertible type laptop computer adopts the first shielding member 13 and the second shielding member 142 of the connecting member 14.

In other words, the manufacturer can only design one kind of upper cover mold, one kind of keyboard frame mold, and one kind of bottom cover mold, and the manufactured upper cover 11a, the manufactured keyboard frame 12a, and the manufactured bottom cover 12b can be used in both of the fabrications of the clamshell type laptop computer and the convertible type laptop computer. Therefore, the manufacturers do not need to prepare different molds and the corresponding parts including different upper covers, different keyboard frames, and different bottom covers for fabricating different types of laptop computers. Since three major parts of the chassis (i.e. the upper cover 11a, the keyboard frame 12a, and the bottom cover 12b) and the molds thereof can be compatibly used, the design and develop cost can be effectively reduce, the manufacturing flexibility for the manufacturers and the utility efficiency of molds can be improved, the types of parts and materials to be prepared can be decreased, and the manufacturing machine can be dynamically adjusted based on the market requirements. For example, if the convertible type laptop computers are more popular in the market, the manufacturer can optionally produce more convertible type laptop computer, and vice versa.

In addition, this disclosure also discloses a laptop computer, which comprises the above-mentioned chassis 1 or 1a. The detailed descriptions of the chassis 1 or 1a can be referred to the above embodiments. If the laptop computer comprises the chassis 1, it is a clamshell type laptop computer. Otherwise, if the laptop computer comprises the chassis 1a, it is a convertible type laptop computer or a clamshell type laptop computer.

Figure 3A:
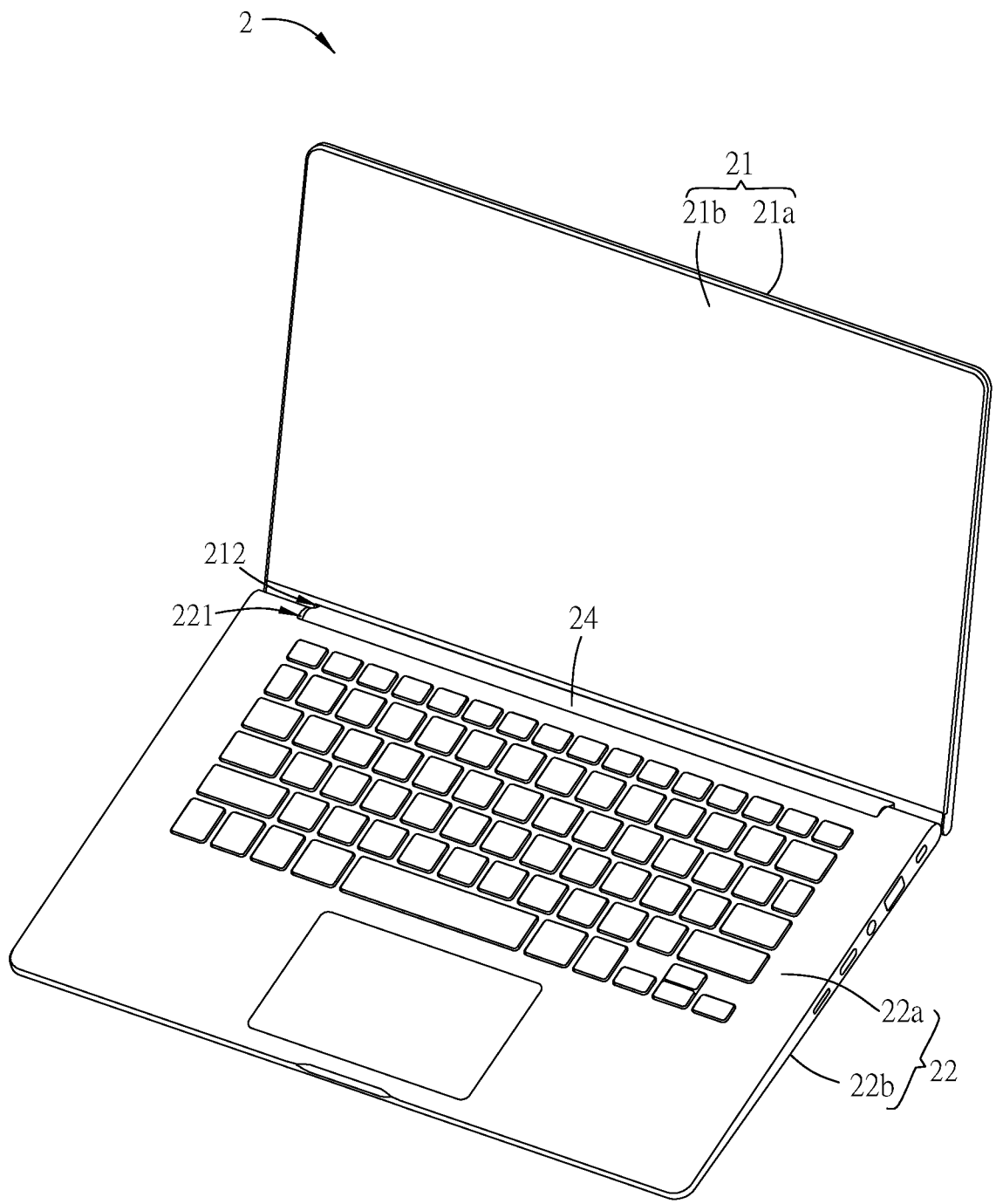
FIG. 3A is a front view of a chassis of a laptop computer according to a third embodiment of this disclosure.
Figure 3B:
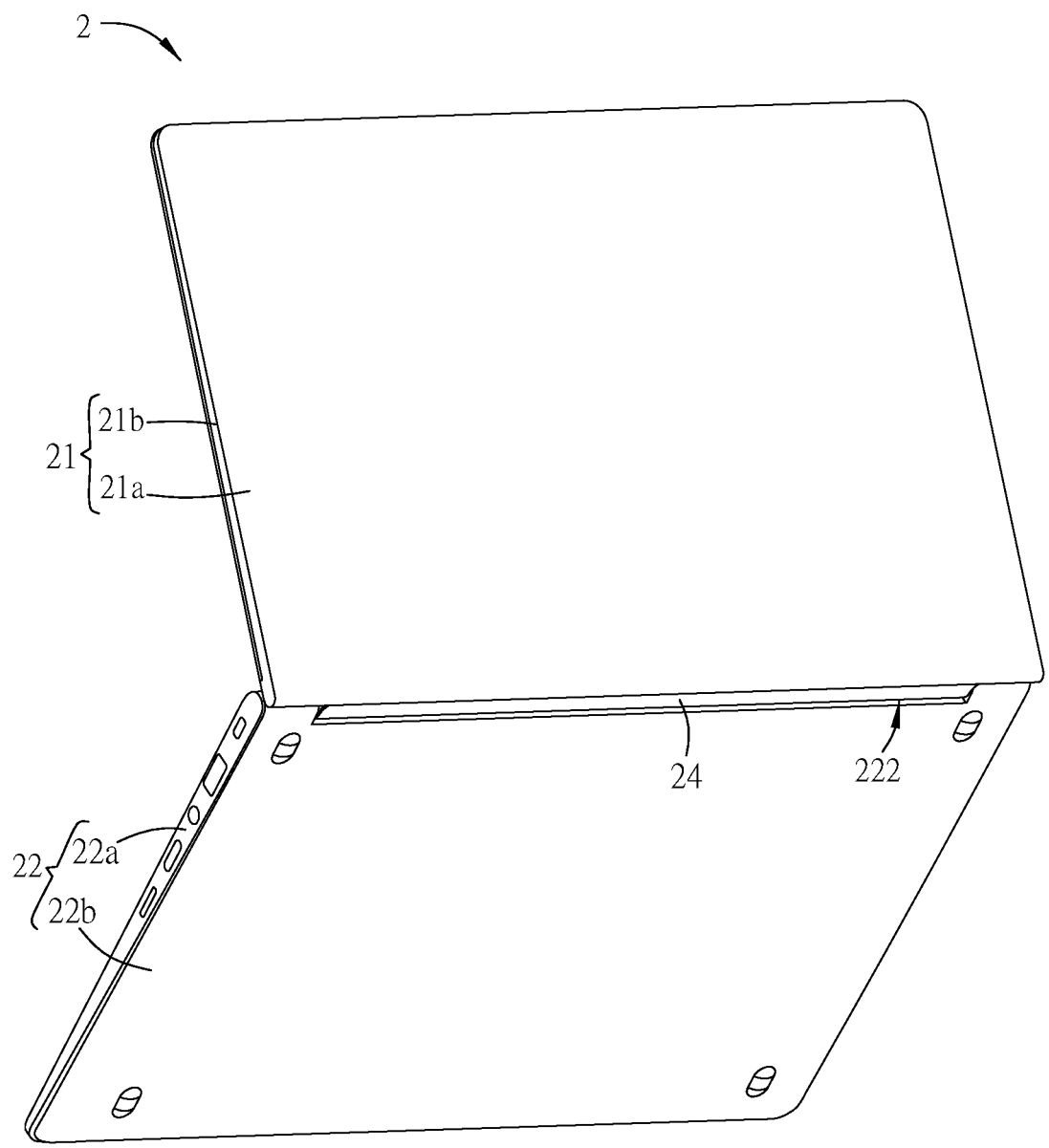
FIG. 3B is a rear view of the chassis according to the third embodiment of this disclosure.

FIGS. 3A and 3B are, respectively, a front view and a rear view of a chassis of a laptop computer according to a third embodiment of this disclosure.

Referring to FIGS. 3A and 3B, a chassis 2 of a laptop computer is applied to, for example, a clamshell type laptop computer. The chassis 2 comprises an upper cover 21a, a screen frame 21b, a keyboard frame 22a, a bottom cover 22b, and a connecting member 24.

The screen frame 21b and the upper cover 21a are connected to form a display case 21. In this embodiment, the upper cover 21a does not have the notch structure, and the center portion of the screen frame 21b is empty, so that the display screen (panel) can be installed inside the display case 21 and partially exposed from the empty portion of the screen frame 21b. Besides the display screen, the components or circuits for controlling the display panel can also be accommodated inside the display case 21. The display screen and the components or circuits for controlling the display panel are not the focus of the disclosure, and the detailed descriptions thereof will be omitted.

The bottom cover 22b is connected with the keyboard frame 22a to form a host case 22. In this embodiment, the keyboard frame 22a has a plurality of openings, so that a plurality of keys can be disposed in the host case 22 and partially exposed from the keyboard frame 22a. Besides the keys, the host case 22 can further accommodate the control circuit board, the memory, the I/O unit, the control circuit, or other accessories. These components are known to the art and are not central to this present disclosure, and the detailed descriptions thereof will be omitted. The keyboard frame 22a has a first notch 221 (FIG. 3A), and the first notch 221 faces toward the display case 21.

As shown in FIG. 3B, the bottom cover 22b has a second notch 222, and the first notch 221 and the second notch 222 are disposed corresponding to each other. Specifically, the keyboard frame 22a has the first notch 221 (as shown in FIG. 3A), and the bottom cover 22b has the second notch 222 (as shown in FIG. 3B). In order to accommodate the additional component, the first notch 221 and the second notch 222 are disposed corresponding to each other, and the widths thereof are correspondingly the same in the lateral direction. Accordingly, the first notch 221 and the second notch 222 can together form an accommodating space for accommodating at least one pivot structure (not shown), so that the display case 21 can be rotatable with relative to the host case 22 through the at least one pivot structure. In this embodiment, one pivot structure is configured to connect the display case 21 and the host case 22, individually, so that the chassis 2 becomes the chassis of a clamshell type laptop computer.

The connecting member 24 is disposed between the display case 21 and the host case 22, and the connecting member 24 is located in the accommodation space for accommodating the above-mentioned at least one pivot structure. In other words, the connecting member 24 is configured to accommodate the pivot structure connecting between the display case 21 and the host case 22. Accordingly, the display case 21 can be relatively moved (i.e., rotated) with respect to the host case 22. In addition, the connecting member 24 can further decorate or modify the appearance of the laptop computer. Herein, the connecting member 24 of this disclosure can also function as a pivot accommodation member. In some embodiments, the connecting member 24 can be directly or indirectly connected to the keyboard frame 22a. In some embodiments, the connecting member 24 can be directly or indirectly connected to the bottom cover 22b. In some embodiments, the connecting member 24 can be directly or indirectly connected to both of the keyboard frame 22a and the bottom cover 22b. Moreover, in order to allow the connecting member 24 to operate normally without generating mechanical interference, one side of the screen frame 21b facing the host case 22 is configured with a fourth notch 212 (FIG. 3A). The fourth notch 212 is disposed adjacent to the connecting member 24 and located corresponding to the connecting member 24, wherein a part of the connecting member 24 is located within the fourth notch 212. The configuration of the fourth notch 212 of the screen frame 21b can prevent the mechanical interference between the connecting member 24 and the screen frame 21b while the display case 21 is relatively rotated with respect to the host case 22.

Figure 4A:
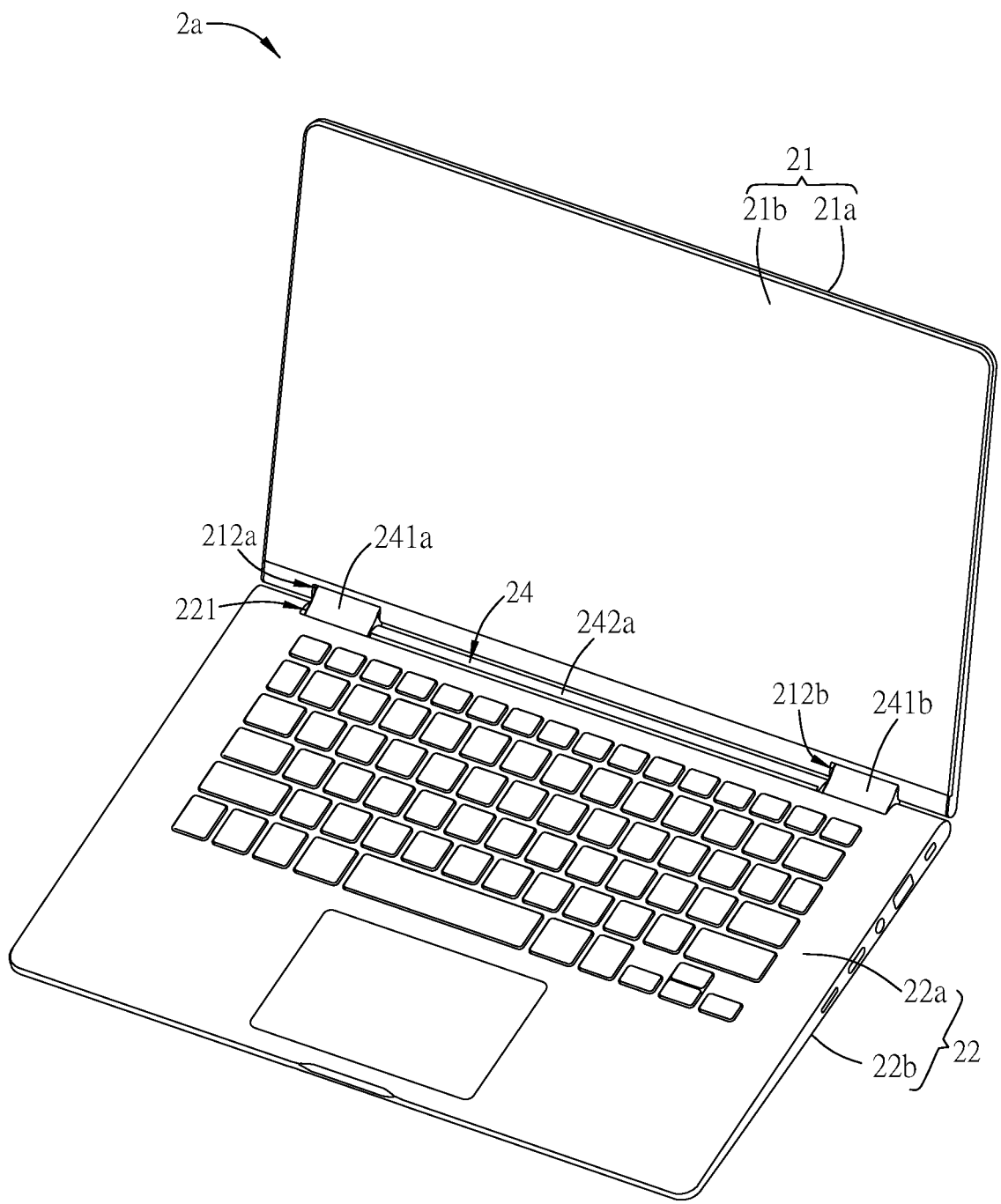
FIG. 4A is a front view of a chassis of a laptop computer according to a fourth embodiment of this disclosure.
Figure 4B:
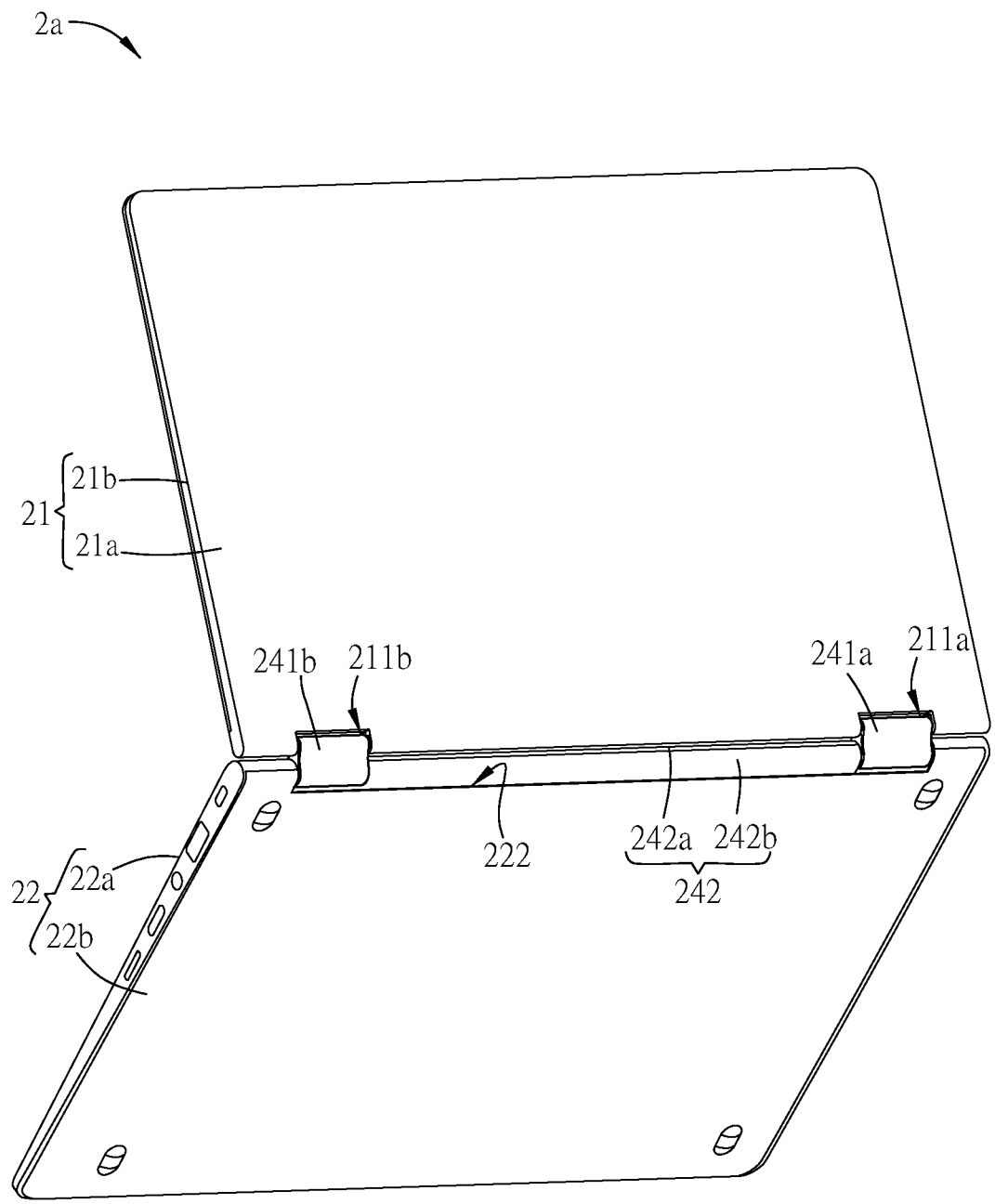
FIG. 4B is a rear view of the chassis according to the fourth embodiment of this disclosure.
Figure 4C:
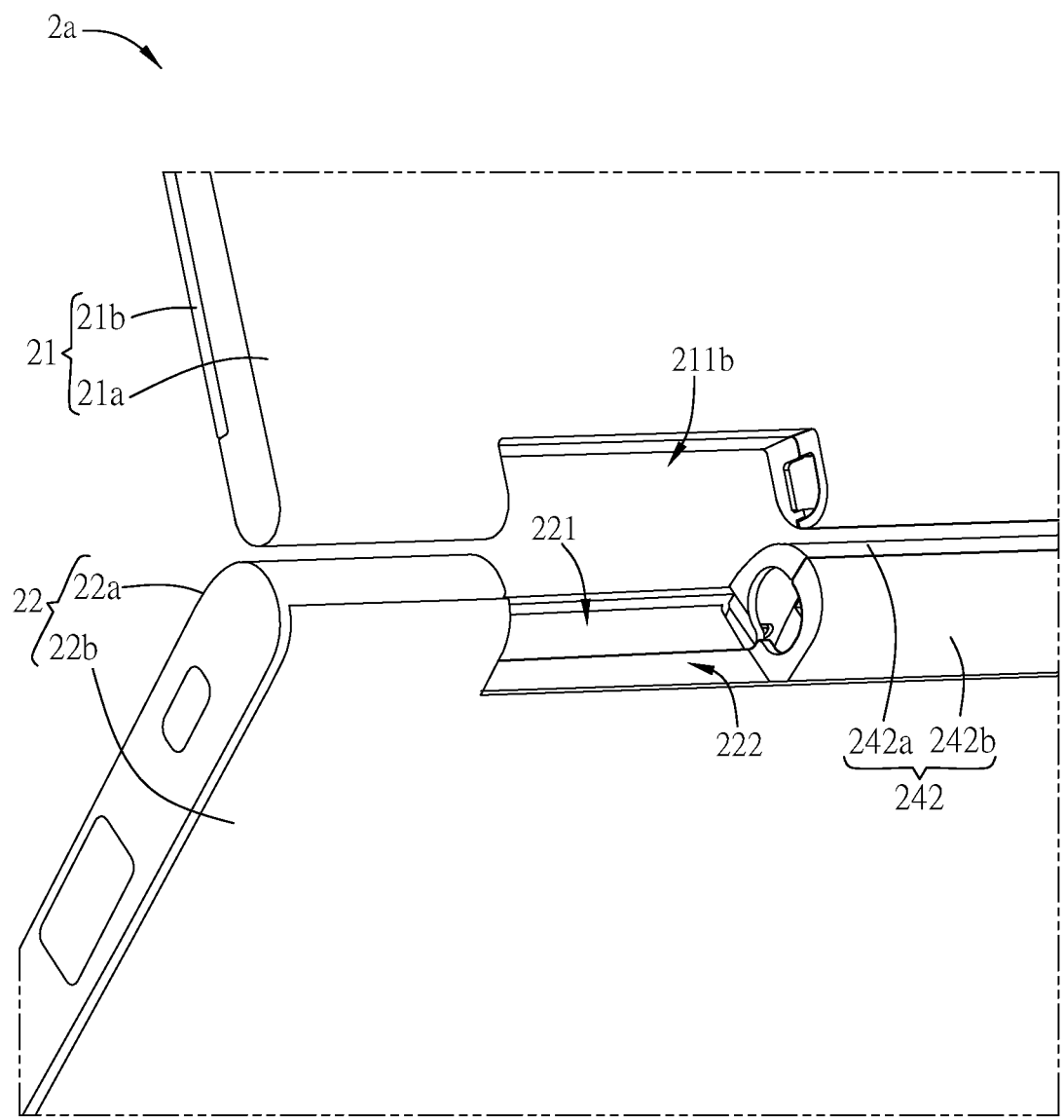
FIG. 4C is a partial exploded view of the rear part of the chassis according to the fourth embodiment of this disclosure.

FIGS. 4A to 4C are, respectively, a front view, a rear view and a partial exploded view of a chassis of a laptop computer according to a fourth embodiment of this disclosure. In this embodiment, the chassis 2a can be applied to a clamshell type laptop computer or a convertible type laptop computer, and this disclosure is not limited.

The components and connections of the components of the chassis 2a of this embodiment are mostly the same as those of the chassis 2 of the third embodiment. Different from the third embodiment, the fourth embodiment comprises two pivot structures, which are disposed at two opposite sides of the accommodation space between the display case 21 and the host case 22. In addition, the connecting member 24 of this embodiment comprises two pivot accommodation members 241a and 241b as shown in FIG. 4A, and the two pivot structures can be located in the two pivot accommodation members 241a and 241b, respectively. Accordingly, the display case 21 can relatively rotated with respect to the host case 22 through the two pivot structures.

Moreover, in order to allow the pivot accommodation members 241a and 241b to operate normally while the display case 21 is relatively moved with respect to the host case 22, the screen frame 21b is further configured with two fourth notches 212a and 212b corresponding to the two pivot accommodation members 241a and 241b, respectively, as shown in FIG. 4A. A part of the pivot accommodation member 241a is located in the fourth notch 212a, and a part of the pivot accommodation member 241b is located in the fourth notch 212b. This configuration can prevent the mechanical interference during the rotation operation of the pivot structures.

In addition, a specific process for the upper cover 21a of this embodiment is needed. Specifically, besides the keyboard frame 22a and the bottom cover 22b, in order to compatibly use the upper cover 21a and the mold thereof (the third embodiment) in the fourth embodiment, the upper cover 21a must be processed to form two third notches 211a and 211b by, for example but not limited to, punching or CNC machining. With reference to FIGS. 4B and 4C, the upper covers of FIGS. 4A to 4C are labeled as 21a, and the two third notches 211a and 211b are disposed corresponding to the two pivot accommodation members 241a and 241b, respectively. Accordingly, a part of the pivot accommodation member 241a is located in the third notch 211a, and a part of the pivot accommodation member 241b is located in the third notch 211b. This configuration can prevent the mechanical interference of the upper cover 21a during the rotation operation.

Besides the pivot accommodation members 241a and 241b, the connecting member 24 further comprises a shielding member 242 (FIGS. 4B and 4C). The shielding member 242 is configured to cover parts of the first notch 221 and the second notch 222, and the shielding member 242 is connected to the host case 22. In this embodiment, the shielding member 242 is located between the two pivot accommodation members 241a and 241b for decorating or modifying the appearance of the host case 22. In some embodiments, the shielding member 242 can be connected with the keyboard frame 22a. In some embodiments, the shielding member 242 can be connected with the bottom cover 22b. In some embodiments, the shielding layer 242 can be connected with the keyboard frame 22a and the bottom cover 22b. The shielding member 242 can be a single component that integrally formed as one piece, or be composed of a plurality of sub-structures. In this embodiment, the shielding member 242 is composed of a first shielding sub-member 242a and a second shielding sub-member 242b (FIG. 4C). The first shielding sub-member 242a is configured to cover a part of the first notch 221, and the second shielding sub-member 242b is configured to cover a part of the second notch 222. In addition, the first shielding sub-member 242a is connected with the keyboard frame 22a, and the second shielding sub-member 242b is connected with the bottom cover 22b. Accordingly, the first shielding sub-member 242a and the second shielding sub-member 242b can be assembled to form the shielding member 242 for decorating or modifying the appearance of the host case 22. Moreover, the additional parts of the first notch 221 and the second notch 222 are configured to accommodate the pivot accommodation members 241a and 241b, respectively, as shown in FIGS. 4A and 4B.

As mentioned above, in the third and fourth embodiments, the keyboard frame 22a has a first notch 221, the bottom cover 22b has a second notch 222, and the first notch 221 and the second notch 222 together form an accommodation space to accommodate at least one pivot structure. Accordingly, the display case 21 is rotatable with relative to the host case 22 through the at least one pivot structure. In addition, the connecting member 24 (may include the shielding member 242) is disposed between the display case 21 and the host case 22, and located in the accommodation space for accommodating the at least one pivot structure. Based on the above-mentioned structural design, the upper cover 21a, the keyboard frame 22a and the bottom cover 22b can be compatibly used in the chassis 2 of the clamshell type laptop computer of the third embodiment and the chassis 2a of the convertible type laptop computer (or the clamshell type laptop computer) of the fourth embodiment by simply processing the upper cover 21a of the chassis 2 of the third embodiment. For example, the upper cover 21a of the chassis 2 of the third embodiment can be processed to form two third notches 211a and 211b, and the processed upper cover 21a can be applied to the fabrication of the convertible type laptop computer of the fourth embodiment.

In other words, the manufacturer can only design one kind of upper cover mold, one kind of keyboard frame mold, and one kind of bottom cover mold, and the manufactured upper cover 21a, the manufactured keyboard frame 22a, and the manufactured bottom cover 22b can be used in the fabrication of the clamshell type laptop computer, while the manufactured keyboard frame 22a, the manufactured bottom cover 22b, and the manufactured upper cover 21a (with a proper additional process) can be used in the fabrication of the convertible type laptop computer. Therefore, the manufacturers do not need to prepare different molds and the corresponding parts including different upper covers 21a, different keyboard frames 22a, and different bottom covers 22b for fabricating different types of laptop computers. Since three major parts of the chassis (i.e. the upper cover 21a, the keyboard frame 22a, and the bottom cover 22b) and the molds thereof can be compatibly used, the design and develop cost can be effectively reduce, the manufacturing flexibility for the manufacturers and the utility efficiency of molds can be improved, the types of parts and materials to be prepared can be decreased, and the manufacturing machine can be dynamically adjusted based on the market requirements. For example, if the convertible type laptop computers are more popular in the market, the manufacturer can optionally produce more convertible type laptop computer, and vice versa.

In addition, this disclosure also discloses a laptop computer, which comprises the above-mentioned chassis 2 or 2a. The detailed descriptions of the chassis 2 or 2a can be referred to the above embodiments. If the laptop computer comprises the chassis 2, it is a clamshell type laptop computer. Otherwise, if the laptop computer comprises the chassis 2a, it is a convertible type laptop computer or a clamshell type laptop computer.

In summary, the upper cover, the keyboard frame and the bottom cover of the chassis of this disclosure as well as the manufacturing molds thereof can be compatibly applied to the clamshell type laptop computer and the convertible type laptop computer. Thus, this disclosure can be applied to the fabrications of the clamshell type laptop computer and the convertible type laptop computer. As a result, the design and develop cost can be effectively reduce, the manufacturing flexibility for the manufacturers and the utility efficiency of molds can be improved, the types of parts and materials to be prepared can be decreased, and the manufacturing machine can be dynamically adjusted based on the market requirements.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A chassis of a laptop computer, comprising:
   a display case, including:
      an upper cover having a first notch, and
      a screen frame connected with the upper cover;
   a host case, including:
      a keyboard frame having a second notch, and
      a bottom cover connected with the keyboard frame, wherein the bottom cover has a third notch respectively disposed corresponding to the first notch and the second notch, the first notch, the second notch, and the third notch together form an accommodation space to accommodate at least one pivot structure, and the display case is rotatable with relative to the host case through the at least one pivot structure;
   a first shielding member configured to cover at least a part of the first notch; and
   a connecting member disposed between the display case and the host case, wherein the connecting member is located in the accommodation space, and the at least one pivot structure is located in the connecting member,
   wherein the chassis is applied to a clamshell type laptop computer or a convertible type laptop computer, the upper cover, the keyboard frame and the bottom cover are compatibly used in the clamshell type laptop computer and the convertible type laptop computer.

2. The chassis of claim 1, wherein the chassis is applied to the clamshell type laptop computer, and the first shielding member is connected with the upper cover.

3. The chassis of claim 1, wherein the chassis is applied to the clamshell type laptop computer, and the first shielding member is connected with the upper cover and the screen frame.

4. The chassis of claim 1, wherein the chassis is applied to the convertible type laptop computer, two of the pivot structures are provided and disposed at two opposite sides of the accommodation space, the connecting member comprises two pivot accommodation members, and the two pivot structures are located in the two pivot accommodation members, respectively.

5. The chassis of claim 4, wherein the connecting member further comprises a second shielding member, the second shielding member is connected with the host case, and the second shielding member is located between the two pivot accommodation members.

6. The chassis of claim 5, wherein the second shielding member is configured to cover parts of the second notch and the third notch.

7. The chassis of claim 5, wherein the second shielding member comprises a first shielding sub-member and a second shielding sub-member, the first shielding sub-member is configured to cover a part of the second notch, and the second shielding sub-member is configured to cover a part of the third notch.

8. The chassis of claim 7, wherein the first shielding sub-member is connected with the keyboard frame, and the second shielding sub-member is connected with the bottom cover.

9. A laptop computer, comprising a chassis, wherein the chassis comprises:
   a display case, including:
      an upper cover having a first notch, and
      a screen frame connected with the upper cover;
   a host case, including:
      a keyboard frame having a second notch, and
      a bottom cover connected with the keyboard frame, wherein the bottom cover has a third notch respectively disposed corresponding to the first notch and the second notch, the first notch, the second notch, and the third notch together form an accommodation space to accommodate at least one pivot structure, and the display case is rotatable with relative to the host case through the at least one pivot structure;
   a first shielding member configured to cover at least a part of the first notch; and
   a connecting member disposed between the display case and the host case, wherein the connecting member is located in the accommodation space, and the at least one pivot structure is located in the connecting member,
   wherein the laptop computer is a clamshell type laptop computer or a convertible type laptop computer, and the upper cover, the keyboard frame and the bottom cover are compatibly used in the clamshell type laptop computer and the convertible type laptop computer.

10. A chassis of a laptop computer, comprising:
    a display case, including:
       an upper cover, and
       a screen frame connected with the upper cover;
    a host case, including:
       a keyboard frame having a first notch, and
       a bottom cover connected with the keyboard frame, wherein the bottom cover has a second notch disposed corresponding to the first notch, the first notch and the second notch together form an accommodation space to accommodate at least one pivot structure, and the display case is rotatable with relative to the host case through the at least one pivot structure; and
    a connecting member disposed between the display case and the host case, wherein the connecting member is located in the accommodation space, and the at least one pivot structure is located in the connecting member, wherein the laptop computer is a clamshell type laptop computer or a convertible type laptop computer, and the upper cover, the keyboard frame and the bottom cover are compatibly used in the clamshell type laptop computer and the convertible type laptop computer.

11. The chassis of claim 10, wherein two of the pivot structures are provided and disposed at two opposite sides of the accommodation space, the connecting member comprises two pivot accommodation members, and the two pivot structures are located in the two pivot accommodation members, respectively.

12. The chassis of claim 11, wherein the connecting member further comprises a shielding member, the shielding member is connected with the host case, and the shielding member is located between the two pivot accommodation members.

13. The chassis of claim 12, wherein the shielding member is configured to cover parts of the first notch and the second notch.

14. The chassis of claim 12, wherein the shielding member comprises a first shielding sub-member and a second shielding sub-member, the first shielding sub-member is configured to cover a part of the first notch, and the second shielding sub-member is configured to cover a part of the second notch.

15. The chassis of claim 14, wherein the first shielding sub-member is connected with the keyboard frame, and the second shielding sub-member is connected with the bottom cover.

16. The chassis of claim 14, wherein when the laptop computer is the clamshell type laptop computer, the upper cover further comprises two third notches, and the two third notches are disposed corresponding to the two pivot accommodation members.

* * * * *